US010479873B2

United States Patent
Minagawa et al.

(10) Patent No.: US 10,479,873 B2
(45) Date of Patent: Nov. 19, 2019

(54) METHOD OF PRODUCING POLYMER-IMPREGNATED BASE RESIN

(71) Applicants: SUMITOMO RUBBER INDUSTRIES, LTD., Kobe-shi, Hyogo (JP); KYUSHU UNIVERSITY, NATIONAL UNIVERSITY CORPORATION, Fukuoka-shi, Fukuoka (JP)

(72) Inventors: Yasuhisa Minagawa, Kobe (JP); Keiji Tanaka, Fukuoka (JP); Hisao Matsuno, Fukuoka (JP); Toyoaki Hirata, Fukuoka (JP)

(73) Assignees: SUMITOMO RUBBER INDUSTRIES, LTD., Kobe-Shi, Hyogo (JP); KYUSHU UNIVERSITY, NATIONAL UNVIERSITY CORPORATION, Fukuoka-Shi (JP)

( * ) Notice: Subject to any disclaimer, the term of this patent is extended or adjusted under 35 U.S.C. 154(b) by 0 days.

(21) Appl. No.: 15/954,296

(22) Filed: Apr. 16, 2018

(65) Prior Publication Data

US 2018/0327560 A1 Nov. 15, 2018

(30) Foreign Application Priority Data

May 12, 2017 (JP) .................................. 2017-095755

(51) Int. Cl.
| | |
|---|---|
| *B01J 20/00* | (2006.01) |
| *C08J 7/02* | (2006.01) |
| *B01J 20/26* | (2006.01) |
| *B01J 20/30* | (2006.01) |
| *B01J 20/32* | (2006.01) |
| *C08J 3/00* | (2006.01) |

(52) U.S. Cl.
CPC .............. *C08J 7/02* (2013.01); *B01J 20/261* (2013.01); *B01J 20/3071* (2013.01); *B01J 20/3078* (2013.01); *B01J 20/321* (2013.01); *B01J 20/327* (2013.01); *C08J 3/005* (2013.01); *C08J 2325/06* (2013.01); *C08J 2333/12* (2013.01); *C08J 2375/04* (2013.01); *C08J 2433/14* (2013.01)

(58) Field of Classification Search
CPC . C08J 3/005; C08J 7/02; C08J 2325/06; C08J 2333/12; C08J 2375/04; C08J 2433/14; B01J 20/3071; B01J 20/261; B01J 20/3078; B01J 20/321; B01J 20/327
See application file for complete search history.

(56) References Cited

U.S. PATENT DOCUMENTS

| 4,575,539 A * | 3/1986 | DeCrosta et al. ... A61K 9/1635 |
|---|---|---|
| | | 514/772.1 |
| 7,507,469 B2 * | 3/2009 | Mao et al. ........... G01N 33/521 |
| | | 422/504 |
| 2003/0203991 A1 | 10/2003 | Schottman et al. |
| 2003/0219562 A1 | 11/2003 | Rypacek et al. |

FOREIGN PATENT DOCUMENTS

| EP | 2100906 A1 | 9/2009 |
|---|---|---|
| EP | 2415490 A1 | 2/2012 |
| JP | 9-131397 A | 5/1997 |
| JP | 2005-516736 A | 6/2005 |
| JP | 2005-523981 A | 8/2005 |

OTHER PUBLICATIONS

Hoshiba et al., "Adhesion-based Simple Capture and Recovery of Circulating Tumor Cells Using a Blood-compatible and Thermo-responsive Polymer-coated Substrate," RSC Adv, vol. 6, 2016, pp. 89103-89112, XP55502668A.
Balcerzyk, E., "Behaviour of swollen poly(ethylene terephthalate) on the action of alcali solutions," Kolloid-Z. u. Z. Polymere (1973), vol. 251, pp. 776-778.
Tanaka, M. et al., "Blood compatible aspects of poly(2-methoxyethylacrylate) (PMEA)—relationship between protein adsorption and platelet adhesion of PMEA surface," Biomaterials (2000), vol. 21, pp. 1471-4781.

* cited by examiner

*Primary Examiner* — Nathan M Nutter
(74) *Attorney, Agent, or Firm* — Birch, Stewart, Kolasch & Birch, LLP

(57) ABSTRACT

Provided is a method of producing a polymer-impregnated base resin which is excellent in providing low adsorption of proteins and blood cells such as platelets. The method of producing a polymer-impregnated base resin includes impregnating a base resin with a polymer solution that includes a solvent able to swell the base resin.

5 Claims, 1 Drawing Sheet

METHOD OF PRODUCING POLYMER-IMPREGNATED BASE RESIN

TECHNICAL FIELD

The present invention relates to a method of producing a polymer-impregnated base resin.

BACKGROUND ART

Matrices, filters, channels, tubes, and other devices for medical and healthcare use used in medical, healthcare and other fields have a drawback in that since they come into contact with blood inside or outside the body during their use, proteins and blood cells such as platelets adhere or adsorb to the surface of the devices and thereby impair the original function of the devices.

Although Patent Literatures 1 and 2 propose to coat the surface of matrices, filters, channels, or tubes for medical and healthcare use with a polymer produced by polymerization of a hydrophilic monomer, it is also desirable to provide other techniques.

CITATION LIST

Patent Literature

Patent Literature 1: JP 2005-516736 T
Patent Literature 2: JP 2005-523981 T

SUMMARY OF INVENTION

Technical Problem

The present invention aims to solve the problem and provide a method of producing a polymer-impregnated base resin which is excellent in providing low adsorption of proteins and blood cells such as platelets.

Solution to Problem

The present invention relates to a method of producing a polymer-impregnated base resin, the method including impregnating a base resin with a polymer solution that includes a solvent able to swell the base resin.

The production method preferably includes, after the impregnation, removing the solvent of the polymer solution, followed by washing with the same solvent as that used in the polymer solution.

The polymer is preferably at least one selected from the group consisting of polyacrylic acid, polyacrylic acid esters, polymethacrylic acid, polymethacrylic acid esters, polyacryloylmorpholine, polymethacryloylmorpholine, polyacrylamide, and polymethacrylamide.

The base resin preferably includes at least one material selected from the group consisting of acrylic resins, cycloolefin resins, carbonate resins, and styrene resins.

The solvent of the polymer solution preferably includes at least one alcohol.

Advantageous Effects of Invention

The present invention relates to a method of producing a polymer-impregnated base resin, which includes impregnating a base resin with a polymer solution that includes a solvent able to swell the base resin. In the polymer-impregnated base resin obtained by this production method, the polymer is impregnated and (mainly physically) immobilized into the base resin. Such a polymer is less likely to be washed away by, for example, washing. Thus, the polymer-impregnated base resin can keep desired performance even after repeated use. Further, proteins and blood cells such as platelets are less likely to adsorb to the polymer-impregnated base resin, and thus it is possible to suitably provide low adsorption of these materials.

DESCRIPTION OF EMBODIMENTS

Figure 1:
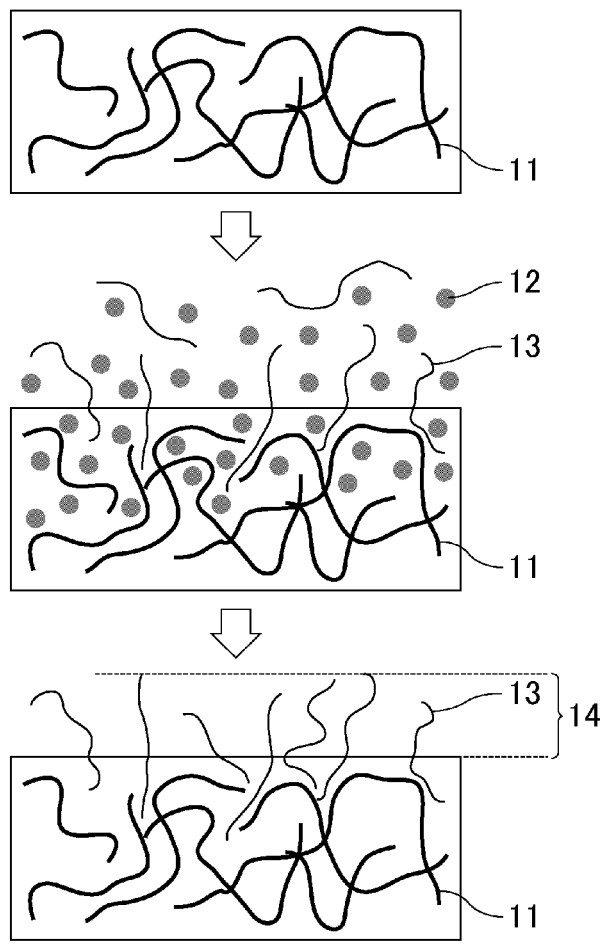
FIG. 1 is a view schematically showing an example of a process of producing a polymer-impregnated base resin according to the present invention.

The present invention relates to a method of producing a polymer-impregnated base resin (a base resin impregnated with a polymer), which includes impregnating a base resin with a polymer solution that includes a solvent able to swell the base resin.

When a base resin is impregnated with a polymer solution that includes a solvent able to swell the base resin, e.g. by immersion, the polymer permeates the base resin along with the solvent. Subsequently, the solvent is removed to produce a base resin containing an impregnated and (mainly physically) immobilized polymer. Such a polymer-impregnated base resin shows reduced adsorption or adhesion of proteins and blood cells such as platelets and red blood cells when it comes into contact with a biological fluid such as blood or proteins.

Accordingly, when, for example, a biological fluid such as blood in contact with the polymer-impregnated base resin is discharged (removed), adsorption or adhesion of blood cells to the surface of the polymer-impregnated base resin can be sufficiently reduced.

Examples of the base resin include acrylic resins (polyacrylic resins) such as polymethyl acrylate, polymethyl methacrylate, polyacrylic acid, and polymethacrylic acid, cycloolefin resins (polycycloolefins), carbonate resins (polycarbonates), styrene resins (polystyrenes), polyester resins such as polyethylene terephthalate (PET), and polydimethylsiloxanes.

In the present invention, a solvent able to swell the base resin is used. In the present invention, the ability to swell the base resin means the ability to permeate the base resin without dissolving the base resin at 70° C. or lower. In this case, the volume of the base resin slightly increases due to permeation of the solvent.

Examples of the polymer include homopolymers or copolymers of various monomers. Specific examples include polyacrylic acid, polyacrylic acid esters, polymethacrylic acid, polymethacrylic acid esters, polyacryloylmorpholine, polymethacryloylmorpholine, polyacrylamide, and polymethacrylamide. The polymer may suitably be a hydrophilic polymer having hydrophilicity. The hydrophilic polymer may be, for example, a homopolymer or copolymer of one or two or more hydrophilic monomers, or a copolymer of one or two or more hydrophilic monomers with additional monomer(s).

Specific examples of the monomers such as hydrophilic monomers include (meth)acrylic acid, (meth)acrylic acid esters (alkoxyalkyl (meth)acrylates such as methoxyethyl (meth)acrylate, hydroxyalkyl (meth)acrylates such as hydroxyethyl (meth)acrylate), (meth)acrylamide, and cyclic group-containing (meth)acrylamide derivatives (e.g. (meth) acryloylmorpholine). Among these, (meth)acrylic acid, (meth)acrylic acid esters, and (meth)acryloylmorpholine are preferred, with alkoxyalkyl (meth)acrylates being more preferred, with 2-methoxyethyl acrylate being particularly preferred.

The additional monomer(s) are not particularly limited as long as they do not inhibit the effects of the present invention. Suitable examples include betaine monomers and deliquescent monomers. Examples of the betaine monomers include carboxybetaines, sulphobetaines, and phosphobetaines. Examples of the deliquescent monomers (monomers which are able to incorporate the moisture (water vapor) in the air and spontaneously turn into an aqueous solution) include alkali metal-containing monomers (monomers which contain an alkali metal in the molecule). In particular, alkali metal salts of 3-sulfopropyl (meth)acrylate are preferred, with potassium 3-sulfopropyl methacrylate being particularly preferred.

The solvent included in the polymer solution (solution prepared by dissolving the polymer in the solvent) may be any solvent capable of dissolving the polymer, such as water or an organic solvent, and examples include alcohols such as methanol and ethanol, acetone, benzene, toluene, methyl ethyl ketone, ethyl acetate, and THF. In particular, the solvent preferably includes at least one alcohol. For example, it may consist of one or two or more alcohol solvents or a solvent mixture of an alcohol and a non-polar solvent.

In the present invention, the solvent able to swell the base resin is preferably a solvent that can swell the base resin while dissolving the polymer without dissolving the base resin. In this case, separation of the polymer can be prevented, and adsorption or adhesion of blood cells and proteins can be significantly reduced, even when the resin is used in matrices, filters, channels, tubes, or other devices for medical and healthcare use under harsh conditions, e.g., in a fast flow environment, or in an acid, alkali, alcohol, or other solutions (e.g. in a solvent that does not dissolve the polymer and thus is different from the solvent of the polymer solution, or in the same solvent as that of the polymer solution at a temperature different from the impregnation temperature), or in repeated use.

In the present invention, a step is performed of impregnating the base resin with the polymer solution. In the present invention, the term "impregnate" means that the polymer is allowed to permeate the base resin. For impregnation, any method that allows the polymer to permeate the base resin may be used. For example, impregnation may be performed by applying or spraying the polymer solution to the base resin or by immersing the base resin in the polymer solution.

In the present invention, after the polymer impregnation of the base resin using the polymer solution, the solvent is appropriately removed, e.g. by drying to obtain a product (polymer-impregnated base resin) in which the polymer is impregnated and (mainly physically) immobilized into the base resin. The impregnation and the subsequent removal of the solvent of the polymer solution may be followed, for example, by washing with the same solvent as that used in the polymer solution, which may then be followed by removal of unimpregnated polymers.

FIG. 1 is a view schematically showing an example of a process of producing a polymer-impregnated base resin according to the production method of the present invention.

When a base resin 11 is impregnated with a polymer solution prepared by dissolving a polymer 13 in a solvent 12 able to swell the base resin 11, the solvent 12 and the polymer 13 penetrate the base resin 11. Subsequently, the solvent 12 is removed, e.g. by drying, while the polymer 13 is left and immobilized into the base resin 11. Thus, a polymer-impregnated base resin (with a polymer-impregnated layer of a thickness 14) is produced in which the polymer 13 is immobilized into the base resin 11.

The thickness of the polymer-impregnated layer in the polymer-impregnated base resin is 2 to 200 nm, preferably 2 to 100 nm, more preferably 2 to 50 nm, still more preferably 2 to 30 nm. A thickness falling within the range indicated above tends to suitably result in low adsorption of proteins and blood cells.

The polymer-impregnated base resin obtained by the production method of the present invention may be applied to, for example, medical analysis devices (matrices, filters, channels, tubes, and other devices for medical and healthcare use used in medical, healthcare and other fields). Examples of such medical analysis devices include those which have a channel zone including a chamber zone, and in which at least part of the channel zone is formed of a polymer-impregnated base resin having a polymer-impregnated layer. In such devices, the polymer can be prevented from being washed away, e.g. during washing. Further, low adsorption of blood cells such as platelets and proteins to the inner surface of the channel zone can be achieved.

The following describes an exemplary embodiment of a medical analysis device with reference to the figure.

Figure 2:
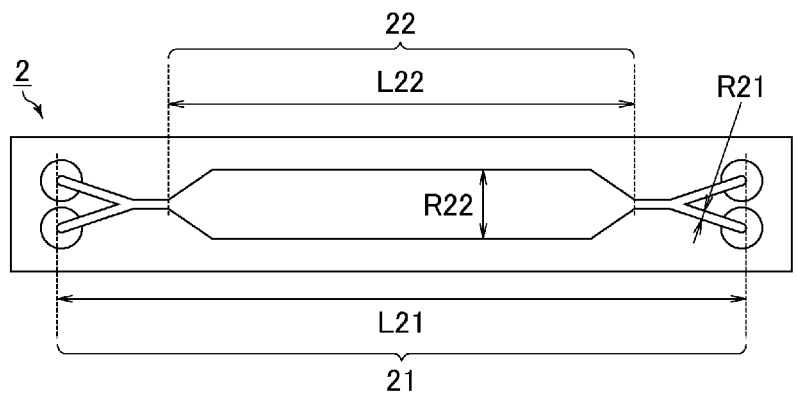
FIG. 2 is a view schematically showing an example of a channel zone including a chamber zone of a medical analysis device.

FIG. 2 is a view schematically showing an example of a medical analysis device 2. The medical analysis device 2 is provided with a channel zone 21 and a chamber zone 22 located in the channel zone 21. The whole or part of the inner surface of the channel zone 21 is formed of a polymer-impregnated base resin (not shown) having a polymer-impregnated layer. The whole or part, preferably the whole, of the inner surface of the chamber zone 22 is also preferably formed of a polymer-impregnated base resin having a polymer-impregnated layer.

When blood or a biological fluid is introduced into the channel zone 21, platelets, red blood cells, and the like are less likely to adsorb to the channel zone 21. The length L21 (in the flow direction) of the channel zone 21 and the (average) width R21 of the channel zone 21 other than the chamber zone 22 may be selected appropriately depending on what to introduce. For example, R21 is preferably 0.1 to 5 mm, more preferably 0.2 to 3 mm.

The shape (e.g. three-dimensional shape, substantially two-dimensional shape (sac-like shape)), size, and other conditions of the chamber zone 22 may be selected appropriately depending on what to introduce.

The medical analysis device may be prepared, for example, by producing a channel zone 21 as shown in FIG. 2 in which the whole or part of the inner surface of the channel zone is formed of a polymer-impregnated base resin having a polymer-impregnated layer, and then optionally adding other members (parts).

Specifically, a channel zone formed of a polymer-impregnated base resin having a polymer-impregnated layer may be produced by impregnating the whole or part of the inner surface of a channel zone with a polymer solution that includes a solvent able to swell the base resin, by known methods, such as (1) by injecting the polymer solution into the channel zone and retaining it therein for a predetermined time, or (2) by applying (or spraying) the polymer solution to the inner surface of the channel zone. Then, other parts may optionally be added to the resulting channel zone, whereby a medical analysis device can be prepared.

The injection, application (spraying), or other processes may be carried out using conventional materials and conventional methods.

Although the retention time in the method (1) or (2) may be selected appropriately depending on the size of the channel zone, the type of liquid introduced, and other factors, it is preferably 5 minutes to 10 hours, more preferably 10 minutes to 5 hours, still more preferably 15 minutes to 2 hours. After the retention, an excess polymer solution may appropriately be discharged, followed by drying.

The chamber zone of the medical analysis device may be a micro-chamber. In the case of a micro-chamber, the width of the chamber zone is preferably 20 to 200 μm, and the number of chamber zones is preferably 100 to 500,000.

In the medical analysis device, at least part of the inner surface of the channel zone preferably has a water contact angle of 25° to 90°. When it has a predetermined water contact angle, the effects of the present invention can be well achieved.

The medical analysis device preferably further includes a filter structure, pillar structure, or dish structure (dish-like concave structure) for cell sorting. Filters and pillars known in the art may appropriately be used.

The polymer-impregnated base resin obtained by the production method of the present invention may be used to analyze blood or a biological fluid. Specifically, with a medical analysis device as shown in FIG. 2 prepared using a polymer-impregnated base resin having a polymer-impregnated layer as described above, adsorption or adhesion of blood cells and proteins in blood or a biological fluid can be reduced.

EXAMPLES

The present invention is described in detail with reference to, but not limited to, examples below.

Example 1

2-Methoxyethyl acrylate was thermally polymerized at 80° C. for six hours using azobisisobutyronitrile (AIBN) to produce poly(2-methoxyethyl acrylate) (PMEA) (molecular weight Mn: about 15,000, Mw: about 50,000).

A solution of poly(methyl methacrylate) (PMMA) in toluene was spin-coated at 3,000 rpm onto a silicon substrate to prepare a base material (PMMA substrate). The substrate was immersed in a 0.5 wt % solution of the PMEA in methanol at 23° C. for two hours and then washed with methanol and vacuum dried to produce a PMEA-impregnated PMMA substrate (base resin: PMMA, polymer: PMEA).

Example 2

A commercial polyurethane sheet was immersed in a 0.5 wt % solution of the PMEA in THF at 23° C. for two hours and then washed with methanol and vacuum dried to produce a PMEA-impregnated PU substrate (base resin: PU, polymer: PMEA).

Example 3

A commercial PMMA substrate (1 mm in thickness) was immersed in a 2.5 wt % solution of the PMEA in methanol at 23° C. for two hours and then washed with methanol and vacuum dried to produce a PMEA-impregnated commercial PMMA substrate (base resin: PMMA, polymer: PMEA).

Example 4

A solution of polystyrene (PS) in toluene was spin-coated at 3,000 rpm onto a silicon substrate to prepare a base material (PS substrate). The substrate was immersed in a 0.25 wt % solution of the PMEA in a 50/50 mixture of methanol and 1-propanol at 50° C. for two hours and then washed with methanol and vacuum dried to produce a PMEA-impregnated PS substrate (base resin: PS, polymer: PMEA).

Example 5

A 2.5 wt % solution of the PMEA in methanol was injected into a commercial PMMA chamber (see FIG. 2), retained therein at 23° C. for two hours, and then removed by suction using a pipette. Subsequently, methanol was injected into the chamber and removed by suction to wash the chamber, followed by vacuum drying to produce a PMEA-impregnated commercial PMMA chamber (base resin: PMMA, polymer: PMEA).

The length L21 and inner diameter (width) R21 of the channel zone, and the length L22 and inner diameter (width) R22 of the chamber zone of the channel used are given below.

L21: 60 mm
R21: 1 mm
L22: 42 mm
R22: 9 mm

Comparative Example 1

A base material (PMMA substrate) was prepared by simply spin-coating a solution of PMMA in toluene at 3,000 rpm onto a silicon substrate.

Comparative Example 2

A commercial polyurethane sheet itself was used (PU substrate).

Comparative Example 3

A commercial PMMA substrate (1 mm in thickness) itself was used (commercial PMMA substrate).

Comparative Example 4

A base material (PS substrate) was prepared by simply spin-coating a solution of polystyrene (PS) in toluene at 3,000 rpm onto a silicon substrate.

The substrates and medical analysis device (channel zone) prepared in the examples and comparative examples were evaluated as described below.

(Thickness of Polymer-Impregnated Layer)

The thickness of the polymer-impregnated layer was determined by measuring (photographing) a cross-section of the substrate on which the polymer-impregnated layer was formed, using a TEM at an accelerating voltage of 15 kV and a magnification of 10,000×.

(Amount of Adhered Platelets)

Platelets were mixed with plasm and adjusted to a platelet concentration (plating density) of $4 \times 10^7$ cells/cm$^2$. The resulting liquid was dropped onto the surface of the substrates or injected into the medical analysis device (channel zone) prepared in each of the examples and comparative examples. These test samples were allowed to stand at 37° C. for one hour. Then, the surface or the interior of the samples was washed with phosphate buffered saline, followed by fixation using 1% glutaraldehyde (standing at 37° C. for two hours). Subsequently, they were washed again with phosphate buffered saline and distilled water.

The resulting samples were observed by SEM to count the number of adhered platelets. The number of platelets was compared relative to that of Comparative Example 1 taken as 1.

(Water Contact Angle)

A volume of 1 μl of distilled water was dropped onto the surface of the substrate or the inner surface of the channel zone. One second later, the contact angle was measured by the θ/2 method at room temperature.

(Amount of Adsorbed Proteins)

Bovine serum albumin labeled with fluorescein isothiocyanate was mixed with phosphate buffered saline to a concentration of 10 mg/mL. The resulting liquid was dropped onto the surface of the substrate, followed by standing at 37° C. for one hour. Then, the surface was washed twice with phosphate buffered saline.

The resulting sample was observed using a fluorescent microscope to determine the fluorescent intensity at 535 nm. The fluorescent intensity was compared relative to that of Comparative Example 1 taken as 1. A smaller value indicates that the amount of adsorbed proteins was small.

TABLE 1

|  | Example | | | | |
| --- | --- | --- | --- | --- | --- |
|  | 1 | 2 | 3 | 4 | 5 |
| Thickness of polymer-impregnated layer (nm) | 18 | 14 | 55 | 10 | 25 |
| Water contact angle (°) | 80 | 65 | 81 | 85 | 82 |
| Amount of adhered platelets | 0.51 | 0.69 | 0.63 | 0.74 | 0.60 |
| Amount of adsorbed proteins | 0.23 | — | — | — | — |

|  | Comparative Example | | | |
| --- | --- | --- | --- | --- |
|  | 1 | 2 | 3 | 4 |
| Thickness of polymer-impregnated layer (nm) | — | — | — | — |
| Water contact angle (°) | 75 | 70 | 77 | 96 |
| Amount of adhered platelets | 1.00 | 1.57 | 1.54 | 1.34 |
| Amount of adsorbed proteins | 1.00 | — | — | — |

The amount of platelets adhered and the amount of proteins adsorbed to the surface of the substrates of the examples which had a polymer-impregnated layer were both smaller than those of the comparative examples. Thus, the examples exhibited low adhesion of platelets and low adsorption of proteins.

The same effect can also be achieved with hydrophilic polymers other than poly(2-methoxyethyl acrylate).

REFERENCE SIGNS LIST

11 Base resin
12 Solvent able to swell base resin
13 Polymer
14 Thickness of polymer-impregnated layer
2 Medical analysis device
21 Channel zone
22 Chamber zone
L21 Length of channel zone
L22 Length of chamber zone
R21 Width of channel zone 21 other than chamber zone
R22 Width of chamber zone

The invention claimed is:

1. A method of producing a polymer-impregnated base resin, the method comprising impregnating a base resin with a polymer solution that comprises a solvent able to swell the base resin,
wherein the polymer is at least one selected from the group consisting of a homopolymer or copolymer of one or two or more hydrophilic monomers, and a copolymer of one or two or more hydrophilic monomers with an additional monomer(s), and
wherein at least one of the hydrophilic monomer is an alkoxyalkyl (meth)acrylate.

2. The method of producing a polymer-impregnated base resin according to claim 1,
wherein the method comprises, after the impregnation, removing the solvent of the polymer solution, followed by washing with the same solvent as that used in the polymer solution.

3. The method of producing a polymer-impregnated base resin according to claim 1,
wherein the base resin comprises at least one material selected from the group consisting of acrylic resins, cycloolefin resins, carbonate resins, and styrene resins.

4. The method of producing a polymer-impregnated base resin according to claim 1,
wherein the solvent of the polymer solution comprises at least one alcohol.

5. The method of producing a polymer-impregnated base resin according to claim 1,
wherein the alkoxyalkyl (meth)acrylate is 2-methoxyethyl acrylate.

* * * * *